F. H. ROGERS.
RECORDING DEVICE FOR USE WITH TAXIMETERS.
APPLICATION FILED MAR. 23, 1909.
953,975.
Patented Apr. 5, 1910.
5 SHEETS—SHEET 3.
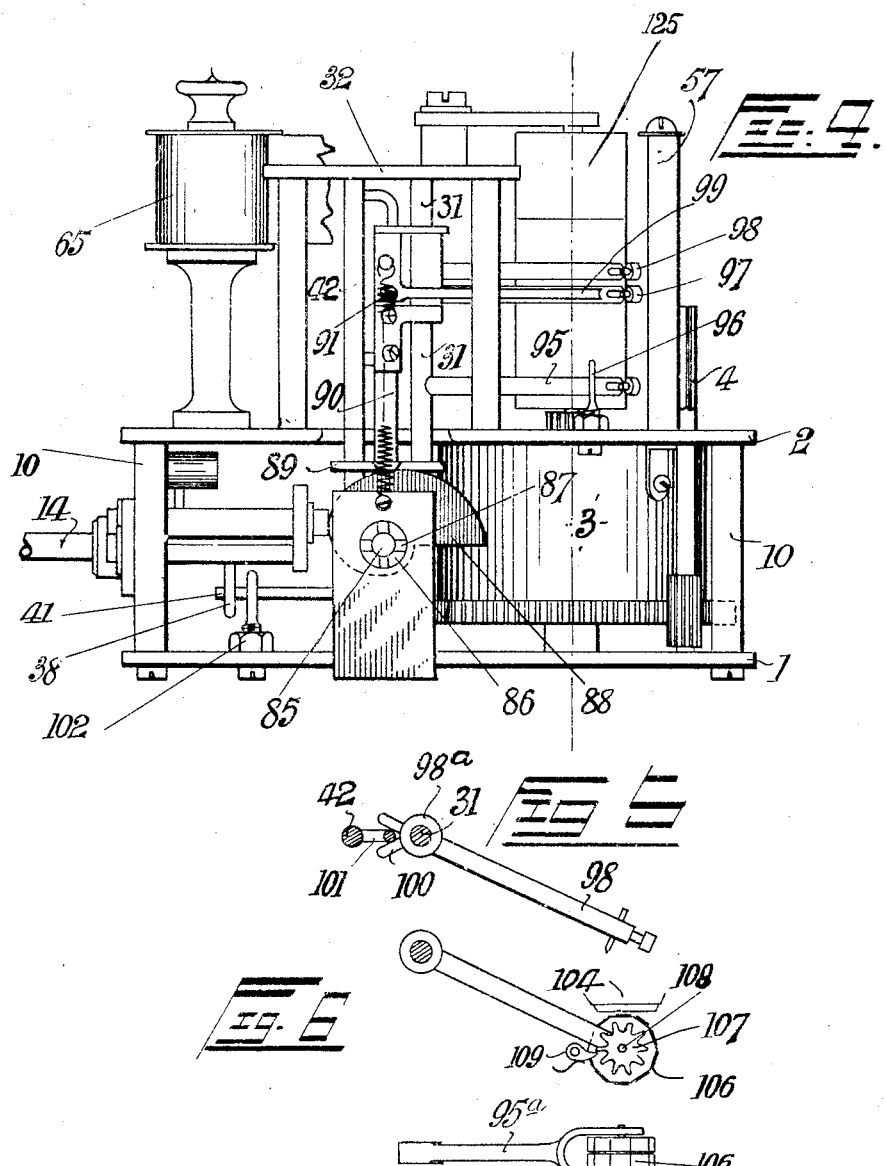

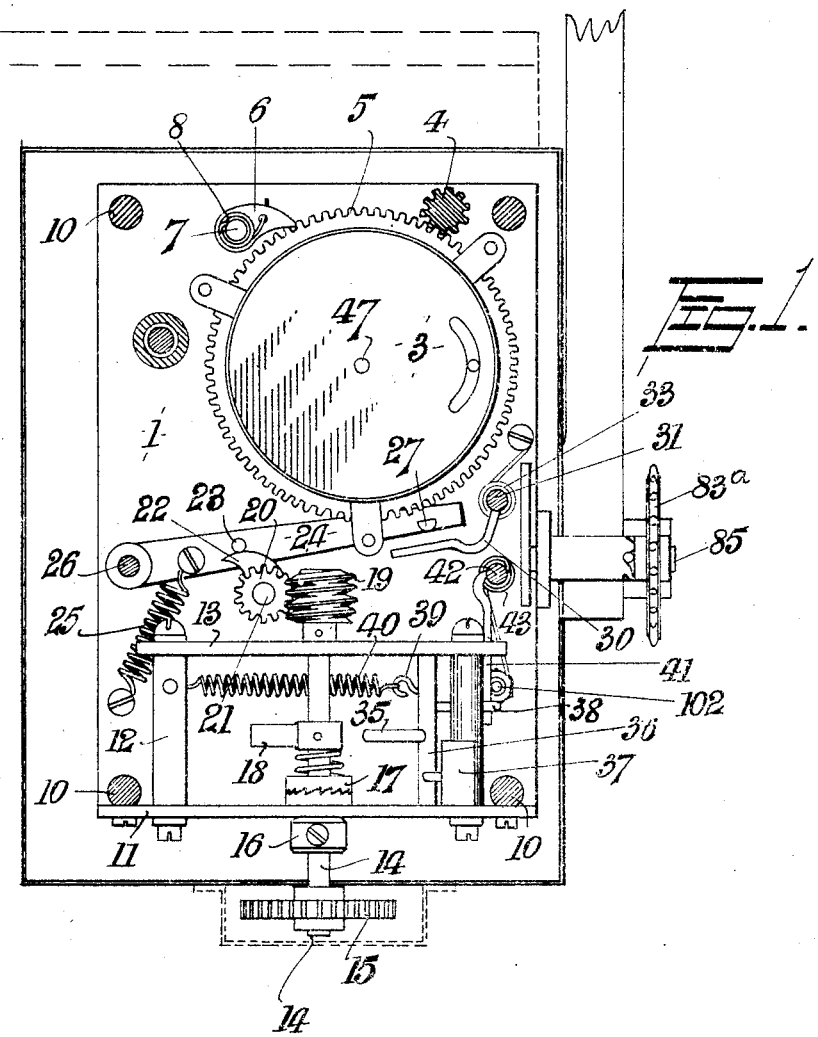

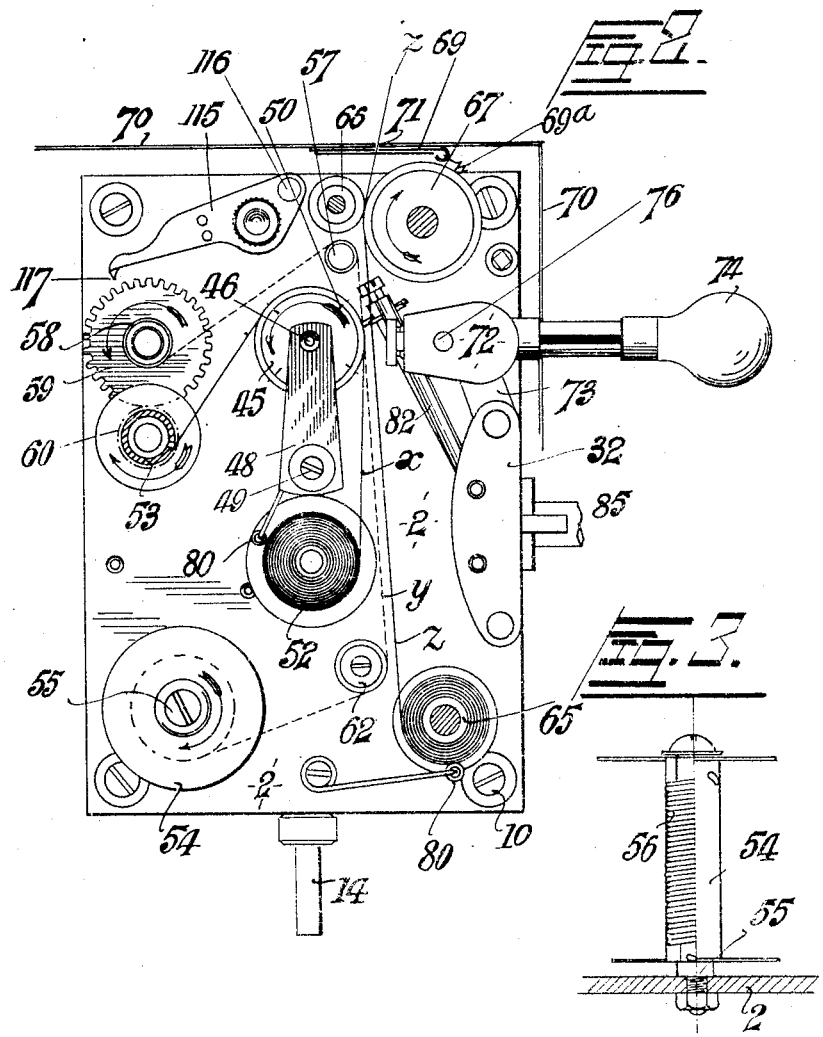

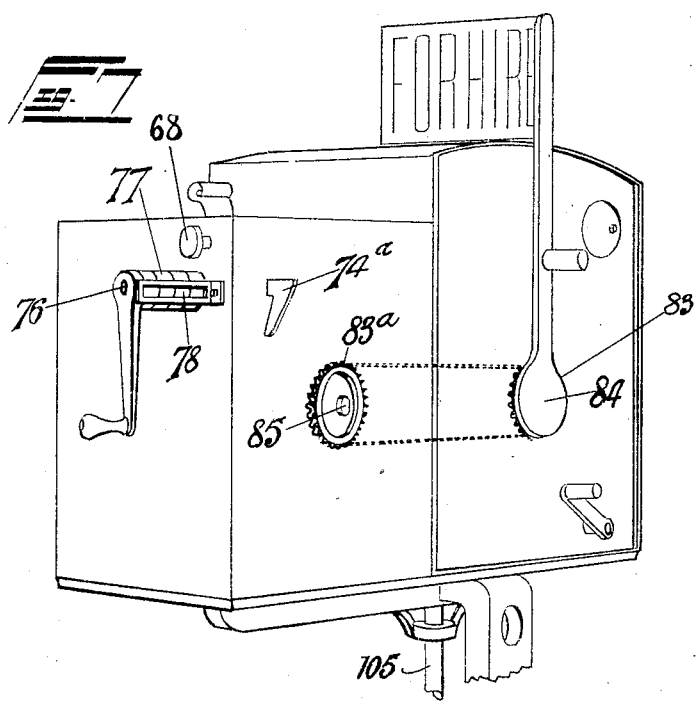

F. H. ROGERS.
RECORDING DEVICE FOR USE WITH TAXIMETERS.
APPLICATION FILED MAR. 23, 1909.
953,975.
Patented Apr. 5, 1910.
5 SHEETS—SHEET 5.
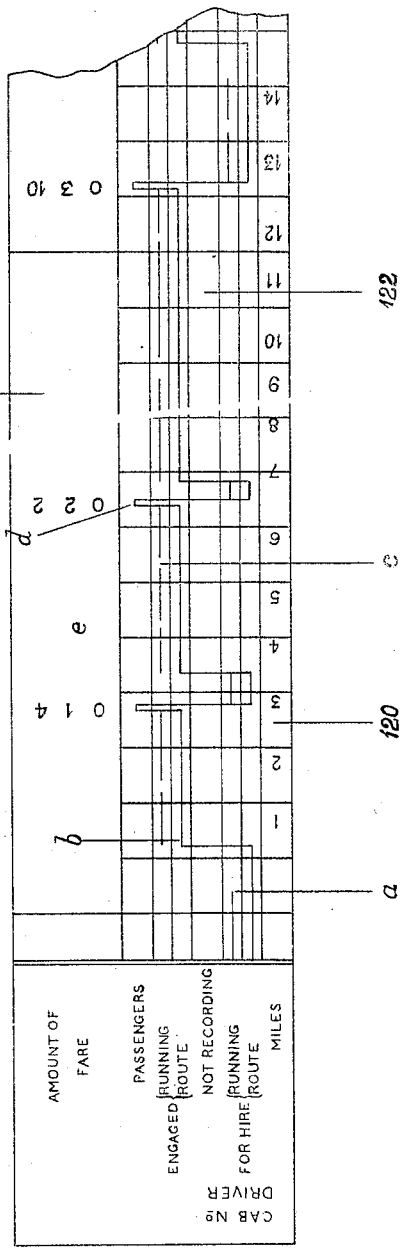

UNITED STATES PATENT OFFICE.

FRANCIS HERON ROGERS, OF EAST CRAGDON, ENGLAND.

RECORDING DEVICE FOR USE WITH TAXIMETERS.

953,975.          Specification of Letters Patent.          Patented Apr. 5, 1910.

Application filed March 23, 1909. Serial No. 485,297.

*To all whom it may concern:*

Be it known that I, FRANCIS HERON ROGERS, engineer, residing at 10 Dingwall road, East Cragdon, Surrey, England, have invented certain new and useful Improvements in Recording Devices for Use with Taximeters; and I do hereby declare the following to be a full, clear, and exact description of the invention, such as will enable others skilled in the art to which it appertains to make and use the same.

This invention relates to improvements in recording devices for use with public vehicle taximeters, and consists of an attachment adaptable to any taximeter for the purpose of providing on a chart a time record of the movement of the vehicle, the number of times the vehicle was hired, the individual fares earned, and the miles run during the day, according to the state of hire.

It further provides for issuing a ticket to the passenger as a voucher for the moneys paid for hire, and means whereby the amount is printed upon said chart as a record against each period of hire indicated thereon.

The further object of the invention is to provide the owner of the cab or other vehicle, with a printed record of the day's takings, and travel of his vehicle, besides imposing a check upon the driver.

The apparatus comprising this invention consists of a time piece capable of allowing said chart to move unit distance per unit of time; the employment of distance and vehicle movement recording devices, consisting of pointers or markers printing on the chart on the time barrel according to their movements, which are in unison with and geared to the driving shaft of the taximeter. A further pointer which is spring pressed into engagement with the chart on the time barrel is together with the running or movement pointer moved over said chart transversely to accord with the movement of the hire indicator lever common to every taximeter so that the movement of the vehicle is indicated upon said chart according to the state of hire of the vehicle as indicated by the taximeter hire indicator flag.

To enable my invention to be better understood I will describe same by reference to the accompanying drawings, in which I have shown a recording device suitable for attachment to a taximeter whose indicating lever moves in a complete circle and is capable of taking up four indicating positions, viz:—"For hire", "Breakdown" (or "Not recording") "Engaged" and "Payment."

In the drawings:—Figure 1. is a part sectional elevation of the apparatus showing the time piece and distance gear. Fig. 2. is a side elevation with cover removed. Fig. 3. shows detail of printing ribbon gear. Fig. 4. is a side elevation placed horizontally on the paper. Fig. 5. shows detail of pointer. Fig. 6. shows detail of mileage printing pointer. Fig. 7. shows recording device attached to the taximeter. Fig. 8. shows the record sheet.

In the drawings 1 is the bottom plate, and 2 the top plate, between these two plates is mounted the time barrel 3 adapted to be wound by pinion 4, gearing with the spur wheel 5 attached to its main spring. It is checked by a pawl 6 mounted on a pin 7 and having a spring 8. The two plates have distance pillars 10 disposed at the corners and mounted between the lower ones as shown in Fig. 1, is a plate 11, having distance pillars 12, supporting a pivot plate 13. Mounted between these plates 11 and 13 is the worm shaft 14, to which is attached the driving spur wheel 15 geared to the distance spur wheel on the taximeter, see Fig. 7, or to the flexible taximeter actuating shaft. The worm shaft has a collar 16 screwed thereto and a spring clutch 17 to prevent backward movement of the said shaft when the direction of drive is reversed. The worm shaft has a tappet 18 and a worm 19 pinned thereto. The worm 19 gears with a worm wheel 20, fast on spindle 21, pivoted between plates 1 and 2. The spindle 21 carries fast thereon a snail cam 22 which is adapted to engage with a pin 23 on lever 24, which pin is kept in engagement with the cam by a spring 25. The lever 24 is pivoted as at 26, and has a projection 27 engaging with a tapping pin 30, brazed to a rod 31. The rod 31 is pivoted between the plate 1 and a plate 32 rigidly secured by pillars to the top plate 2. A spring 33 whose ends are attached to the rod 31 and the plate 1 normally tends to keep the rod in the position shown, the arrangement being that at each revolution, the projection 27 gives a sharp tap to the pin 30, causing the rod 31 to partly revolve. The tappet 18 engages with a pin 35, brazed to a spindle 36, this spindle carries a counterbalance 37 and tapper pin 38. It also has a hook 39 and spring 40. The tapper pin 38 engages with a tapping pin 41 brazed to a rod 42 similarly pivoted as the rod 31, and having a similar spring 43, around its base. The time piece 3, drives the paper feed or time barrel 45, (see Fig. 2). This barrel is mounted on a shaft 46 geared to the hour shaft 47 (see Fig. 1) on time piece. The shaft 46 is pivoted into a bracket 48, screwed to a pillar 49.

The time barrel has pins 50 adapted to enter the paper and feed same. The record paper $x$ is wound on a spool 52 (shown in section) and after passing over the time barrel, is wound on a spool 53 which exerts a positive pull on the paper as follows:—The ink ribbon $y$ is wound on a spring barrel 54 (see Fig. 3). This barrel is mounted upon a pin 55 screwed into the plate 2 and the coiled spring 56 so mounted that a pull on the ribbon winds it up. The ribbon $y$ is led over the paper on the time barrel around the peg 57 and thence onto the ribbon spool 58. The spool 58 has a spur wheel 59 geared into a pinion 60 on the record paper spool 53. In this way the paper record ribbon is wound onto its spool in the same direction as the rotation of the time barrel, thereby assisting its movement, while the ribbon moves in a reverse direction. The ink ribbon is arranged to make only a surface contact, on the paper, being led over a peg 62.

Mounted on the plate 2 is a paper ticket spool 65. The ticket feed $z$ passes over the time barrel 45 without touching it then through feed rollers 66 and 67 one of which, 67, is capable of being actuated by hand from the outer case, as see Fig. 7, in which a handle 68 is shown. The paper ticket then passes through a knife blade 69, and issues from the recorder case 70, through an aperture 71. A self inking stamping device 72 is mounted as shown, supported on bracket 73, and capable of being operated by a handle 74, as shown in Fig. 2, when the recorder is attached to a taximeter of the semi-rotary indicator lever type, or to be actuated by the recorder lever when used with the rotary type, (see Fig. 7), when the handle is replaced by a knob 74ᵃ having an inclined surface, which is depressed by the hire indicator lever.

The spindle 76 of the printing device is prolonged through the case and has a setting device 77 of the well known type, adapted to indicate the state of the stamping wheels through the sight 78, which is set by the driver to accord with the charge indicated on the taximeter. Alternatively I may use a zeroizing stamp and actuate same from the unit totalizer, when same is present in the taximeter, but I do not confine myself to this method. In this latter case the stamp is actuated after each movement of the indicating lever to "Engaged", working in unison with the totalizer, and zeroized by the return of the flag to "For hire". It being arranged in either case that the indicating lever cannot be moved to its "For hire" position until the knob 74ᵃ or the handle 74 has been depressed and the fare charged to the passenger impressed upon the ticket and through the ribbon to the record sheet as shown in Fig. 8.

Both the ticket spool and the record paper spool have spring tension rollers 80 which prevent the paper on the spool from unwinding and keep the feed taut.

The record shown upon the chart 81 (see Fig. 8) is produced by the action of the pens or pointers 82 whose positions over said chart are determined by the position of the hire indicating lever.

The mechanism is as follows:—A pitch chain wheel 83 is fixed on the indicator lever spindle 84 and a similar wheel 83ᵃ on the spindle 85 of the recorder. These are connected by a chain. The spindle 85 (see Fig. 4), passes through a bush 86, which has engagement notches 87 cut in its end (see Figs. 1 and 4), to correspond (in this case) with the position of the hire indicator lever. Fast on spindle 85 is a cam 88 bearing against a flat wiper 89. The wiper 89 forms part of the slider 90 which moves upon the rods 31 and 42 which serve as guide rods, against the action of a coiled spring 91. Mounted upon the rod 31 is the mileage pointer 95 normally held above the chart against limiting stop 96, by the action of spring 33. Also mounted upon the rod 31 is the route pen or pointer 97 and the running pointer 98. The route pen 97 is loosely mounted upon rod 31 and kept upon the ink ribbon $y$ over the chart $x$ by a spring 99, this pen never leaves the barrel, and thereby indicates the route of the vehicle under all conditions of hire or vacancy as well as time during the whole period that the vehicle is out of the owner's hands. The running pointer 98 is provided with pegs 100 upon its boss 98ᵃ. (See Fig. 5). Between these pegs 100 is a bar 101 brazed to rod 42. These pointers are operated as follows:—The running pen is normally held above the chart and ink ribbon, and marks a line by a series of dots, which are made by the bar 101, (see Fig. 5), being raised by reason of the movement of the rod 42 partly rotated by the tapper 18, the movement of the bar 42 is limited by the tapping pin 41 engaging with a pin 102 screwed into the plate 1.

The mileage pointer is operated every mile, by the projection 27 on lever 24 tapping the pin 30 and partly rotating the rod 31 which depresses the pointer against the action of the spring 33, the ratio of gearing between the worm wheel 20, (see Fig. 1) and the shaft 105 (see Fig. 7), which latter actuates the spur wheel 15 driving the worm shaft, being calculated to give an impression or dot every mile. In place of the dot we may print the miles upon the chart, by the apparatus shown in Fig. 6. This consists of a veeder type of counting mechanism with raised numbers. The pen 95 is replaced by a fork 95ª, carrying the counter wheels 106 driven by a star wheel 107 on spindle 108. An ink pad 104 takes the place of the limiting pin 96. The star wheel engages with a spring pawl 109 pivoted on plate 2, which engagement causes the counter to part revolve every time the fork 95ª is depressed.

The chart (see Fig. 9) is divided into five minute vertical sections 120, which are again divided into hour sections 121, and are in agreement with the amount of peripheral movement of the time barrel 45, and is divided horizontally as shown, the horizontal divisions corresponding to the positions taken up by the hire indicator lever, and sub-divided in the case of the "Engaged" and "For hire" positions as at 122, into running and route divisions for the use of the indicating lines made by the running and route pens or pointers respectively.

The operation of this invention is as follows:—In attaching the recorder to the taximeter the pitch chain is adjusted to the pitch chain wheels 83 and the spur gear for driving from the vehicle wheels fitted into place, the unit totalizer shaft being connected to the charge stamp 72 if this form of stamp setting device is employed. The time piece 3 is then wound up by pinion 4, see Fig. 4, the ticket spool is then fitted with a ticket ribbon z the end being led out of the case. The ink ribbon y is then wound off the spool 54 onto the spool 58 until sufficient tension has been produced. When this point is reached the catch 115, (see Fig. 2) pivoted at 116 is moved so that its pointer 117 engages with the teeth of the spur wheel 59. The paper record ribbon x is now placed on the spool 52, its end led over the time barrel and placed around the spindle of spool 53. The spool 52 has a projection 53ª over which fits a split sheath 53ᵇ securing the paper in place. The catch 115 is now put back into the position shown in Fig. 2, releasing the ink and record ribbon spools, which causes both ribbons to become taut between their spools. The recorder is now ready for use. The pointers 97 and 98 will take up upon the chart the position denoted by the hire indicator lever of the taximeter. The chart x is moving during the whole time being propelled by the tension existing between the two spools and its motion controlled by the time barrel 45, which acts as an escapement. Depending upon whether the vehicle is moving or standing still the running pointer marks on the chart or not according to the operation previously described.

Reference to Fig. 8 will show a copy of the actual chart capable of being produced. At a the vehicle is on the rank, the running line having ceased and the taximeter lever indicating "For hire." At b a passenger has been secured, the taximeter indicating "Engaged." At c the vehicle has been stopped possibly in the traffic or at the request of the passenger. At d the passenger has alighted and paid the driver who issues a ticket to the passenger with the amount so paid printed on it and a copy thereof on the chart as indicated at e. In this way the owner can check either time or distance hire by the chart in any individual run, and so discover fraud through collusion of the driver and fare. On the other hand in taximeters having two figure recording dials, it is possible to "pump" the taximeter indicator lever until the two dials are back to an original or any desired number. This would at once be detected on the chart as a series of vertical lines from "For hire" to "Passenger" would appear. The owner can further check the time the driver spends on the rank, and at any period of the day determine whether the cab was idle or not.

In giving the passenger a ticket the driver sets the fare wheels to the taximeter figures (if the stamp is not attached to the unit totalizer) and then moves the flag to "Payment" or "For hire" in doing which he depresses the stamp 72 which prints the amount on the ticket. He then turns the handle 68 one revolution and pulls the ticket, this moves the knife 69 which has a slanting blade against the spring 99ª, cutting the ticket off.

In order to prevent tampering with the recording device, all its connections to the taximeter are covered up, and to prevent the clock being stopped by tying the ticket printer so that its figures press on the time barrel, I form the upper part of the said time barrel distinct from that of the lower part, which latter is driven by the clock. This upper part 125, (see Fig. 4), is loosely mounted on the shaft and is covered with a hard rubber composition. In the event of the stamp being held on the surface the pull on the paper is sufficient to counteract this by causing the roller to revolve.

I claim.

1. The combination, with a taximeter, of a recorder comprising a time-piece provided with a shaft which is revolved once an hour, a chart carrier adapted to mount a chart under tension and operatively connected with the hour-shaft of the time-piece, marking devices for forming a record on the chart, and driving mechanism operatively connecting the marking devices with the taximeter so that its movements are recorded.

2. In a recorder, the combination, with a time-piece provided with a shaft which is revolved once an hour, of a chart carrier adapted to mount a chart under tension and operatively connected with the hour-shaft of the time-piece, an ink-ribbon carrier adapted to mount an ink-ribbon under tension, spring driving devices operating to move the chart and the ink-ribbon simultaneously and in the same direction as the hour-shaft and to assist in revolving the hour-shaft, and marking devices for engaging with the said ink-ribbon and chart.

3. In a recorder, the combination, with a time-piece provided with a shaft which is revolved once an hour, of a chart carrier adapted to mount a chart under tension and operatively connected with the hour-shaft of the time-piece, an ink-ribbon carrier adapted to mount an ink-ribbon under tension, spring driving devices operating to move the chart and the ink-ribbon simultaneously and in the same direction as the hour-shaft and to assist in revolving the hour-shaft, a ticket-ribbon carrier supporting a ticket-ribbon adjacent to the ink-ribbon and chart, a hand-stamp arranged to print the ticket-ribbon and to simultaneously duplicate such imprint upon the chart, and marking devices operated separate from the hand-stamp for engaging with the said ink-ribbon and chart.

In testimony whereof I affix my signature, in presence of two witnesses.

FRANCIS HERON ROGERS.

Witnesses:
H. D. JAMESON,
F. L. RAND.